(12) United States Patent
Fukuo (10) Patent No.: US 7,621,419 B2
(45) Date of Patent: Nov. 24, 2009

(54) DOOR OPERATING MECHANISM AND UNIT

(75) Inventor: Michihiro Fukuo, Hachioji (JP)

(73) Assignee: NIFCO Inc., Yokohama-Shi, Kanagawa (JP)

( * ) Notice: Subject to any disclaimer, the term of this patent is extended or adjusted under 35 U.S.C. 154(b) by 675 days.

(21) Appl. No.: 11/197,327

(22) Filed: Aug. 5, 2005

(65) Prior Publication Data
US 2007/0034636 A1   Feb. 15, 2007

(51) Int. Cl.
*B65D 43/26* (2006.01)

(52) U.S. Cl. .......................... 220/264; 220/827; 16/354; 49/333; 49/386

(58) Field of Classification Search .................... 49/139, 49/140, 386, 394, 397, 400, 324, 333, 336, 49/381; 220/264, 827, 263, 830, 835; 74/89.16, 74/89.17, 89.18, 411, 422; 16/354
See application file for complete search history.

(56) References Cited

U.S. PATENT DOCUMENTS

| | | | | |
|---|---|---|---|---|
| 1,354,787 | A * | 10/1920 | Voina-Hansen | 220/263 |
| 3,618,561 | A * | 11/1971 | Wallis et al. | 455/158.1 |
| 4,688,695 | A * | 8/1987 | Hirohata | 49/364 |
| 5,620,122 | A * | 4/1997 | Tanaka | 224/275 |
| 6,662,405 | B2 * | 12/2003 | Vitry | 16/355 |
| 6,857,675 | B2 * | 2/2005 | Kurachi et al. | 296/37.12 |
| 7,063,225 | B2 * | 6/2006 | Fukuo | 220/264 |
| 7,140,071 | B2 * | 11/2006 | Tonogai | 16/325 |
| 7,192,072 | B2 * | 3/2007 | Schmidt et al. | 296/37.12 |
| 7,231,692 | B2 * | 6/2007 | Harada | 16/345 |
| 2003/0071047 | A1 * | 4/2003 | Harada | 220/835 |
| 2003/0080131 | A1 * | 5/2003 | Fukuo | 220/264 |
| 2004/0020129 | A1 * | 2/2004 | Thilly et al. | 49/381 |
| 2005/0133507 | A1 * | 6/2005 | Tanaka | 220/263 |
| 2005/0133523 | A1 * | 6/2005 | Kim | 220/827 |

FOREIGN PATENT DOCUMENTS

| | | |
|---|---|---|
| JP | 08-310309 | 11/1996 |
| JP | 2003-129742 | 5/2003 |

* cited by examiner

*Primary Examiner*—Katherine W Mitchell
*Assistant Examiner*—Catherine A Kelly
(74) *Attorney, Agent, or Firm*—Manabu Kanesaka (57) ABSTRACT

A door operating mechanism is provided for rotatably switching a door relative to a base between a closed position and an open position. A sector gear is disposed in a support arm projected from the door. A rotary gear is disposed substantially in the center of the arc of the sector gear. A first gear of the base has internal teeth disposed to engage the sector gear. A second gear of the base is resiliently and displaceably disposed to engage the rotary gear. The door is rotatably disposed along a track corresponding to the first gear via engagements between the first gear and the sector gear, and engagements between the second gear and the rotary gear. A load received by the door in the closed position towards the bottom of the base is absorbed by resilient displacement of the second gear.

7 Claims, 8 Drawing Sheets

DOOR OPERATING MECHANISM AND UNIT

BACKGROUND OF THE INVENTION AND RELATED ART STATEMENT

The present invention relates to a door operating mechanism for operating a door relative to a box-shaped base, and a unit including the same. As used herein, the term "box-shaped base" is interpreted broadly to include various types of storage body, housing and the like, and the term "door" is also interpreted broadly to include lid, cover and the like.

A door operating mechanism, including a door that is rotatably switched between the closed and open positions relative to the opening of a box-shaped base, via a shaft or the like, is not attractive and is less sophisticated in appearance, as the door projects extensively from the base in the open position.

Figure 8A:
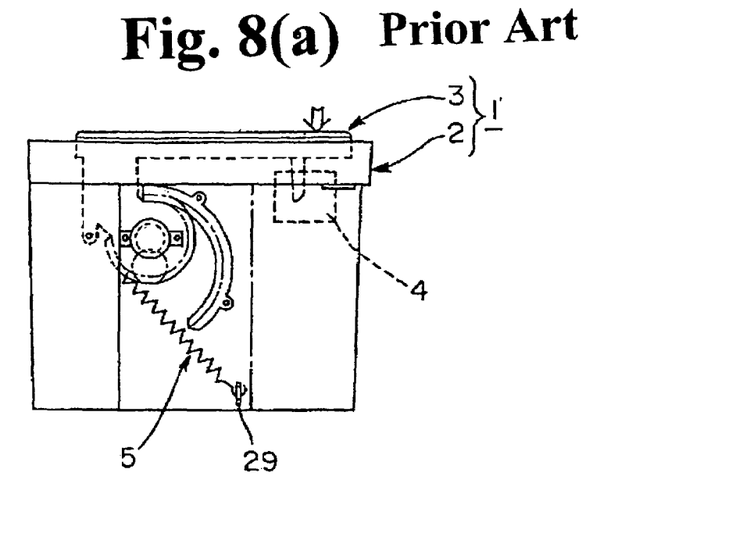
Figure 8B:
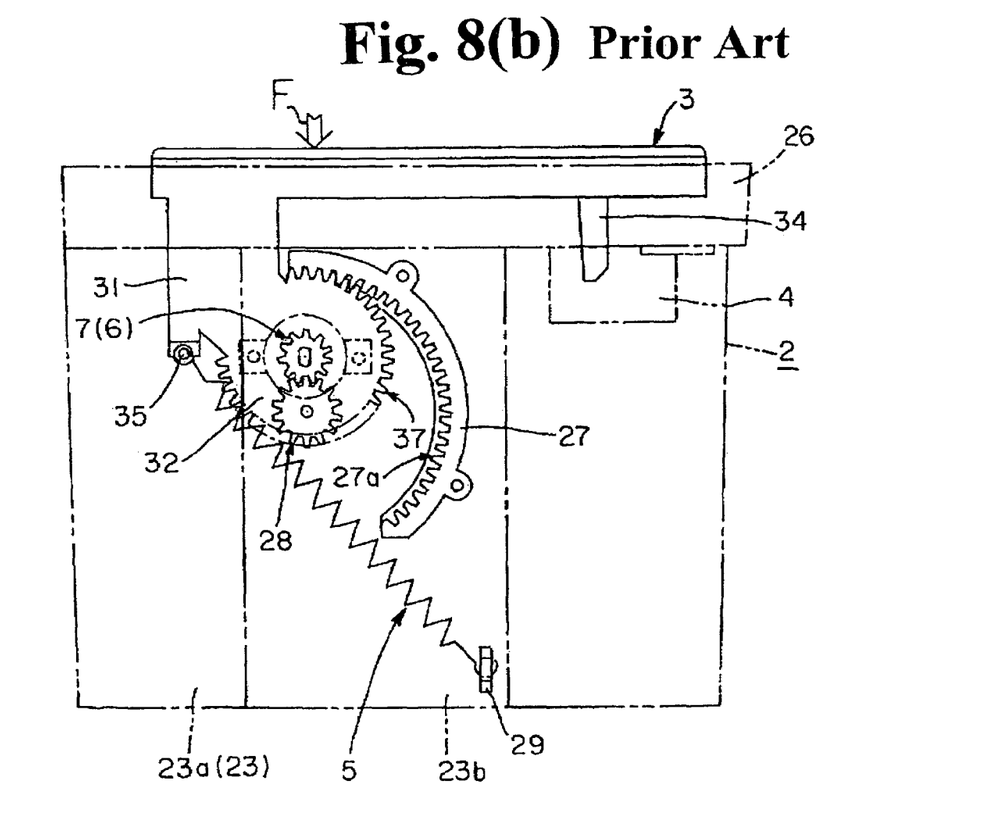

Such a door operating mechanism and the unit including the same, as shown in FIGS. 8(a) and 8(b), were developed by the present inventors in their effort to remedy such shortcomings, as provided in Japanese Patent Laid-open Publication No. 2003-129742 ("JP 2003-129742").

The door operating mechanism, as shown in FIGS. 8(a) and 8(b), as employed in the box 1, comprises a biasing means 5 to bias the open position, lock means 4 to lock the door 3 against the bias force of the biasing means 5, and damper means 6 for applying damping force.

The base 2 is bordered with a flange 26 on the upper side, and the side walls thereof, located in the rear portions 23a, extend outward beyond those in the front portions 23b. A window is formed in one end surface of the extending section to allow for communication between the outside and the inside.

The door 3 has a support arm 31 so arranged as to come out from the interior of the base 2 through the aforementioned window. The damper means 6 is attached to the disc 32 of the arm 31. The lock means 4 locks the engaging piece 34 of the door 3 with a push operation, and unlocks it with another push operation.

The biasing means 5 is secured to a projection 29 of the base 2 at one end, and the shaft 35 of the arm 31 at the other end. The characteristics of this mechanism, as shown in FIG. 8(b), i.e., which in an enlarged schematic diagram, include the following. The mechanism has a sector gear 37 disposed in the arm 31 of the door 3 and a rotary gear 7 disposed in the center of the arc of the gear 37. The rotary gear 7 includes the damper means 6. In addition, the base 2 has a first stationary gear having internal teeth 27a disposed in the sector rib 27, in order to engage with the gear 37, and a second stationary gear 28 disposed inward from the first stationary gear 27a, to engage with the rotary gear 7.

In the operation of the above described mechanism, the door 3 is moved along the track of the internal teeth of the first stationary gear 27a, during which movement, the engagements between the gear 37 and the first stationary gear 27a, and between the rotary gear 7 and the second stationary gear 28, are maintained. By moving the fulcrum of the door 3 up or down in compliance with the internal gear (and the gear section of the second stationary gear 28) while the door 3 is rotatably switched from the closed position to the open position, and vice versa, the amount of the door 3 projecting from the interior of the base 2 can be reduced. In addition, during the process of rotational switching, a decent operation can result from the damping force applied by the damper means 6 and the respective engagements between the gears.

However, in the door operating mechanism, and the unit including the same described above, when the door is subjected to a large load F from above while in the closed position, the load conveys to the rotary gear 7, which is engaged with the second stationary gear 28 of the base. This may potentially damage the section or the support of the rotary gear 7 that is engaged. Where the rotary gear 7 is mounted to the output shaft of the damper means 6, the load may cause oil, which is included with the damper means 6 and fills the damper body, to leak.

These deficiencies become more prominent when the door 3 is to also serve as an arm rest, a simple table, or the like, in addition to cases where an object is inadvertently dropped or rested on the door 3.

It is therefore an object of the present invention to solve the problems described above to thereby eliminate possibilities of damaging or breaking the rotary gear or the related members and gears, while improving the quality and reliability, without limiting the applications.

Other objects of the present invention will become apparent from the description of the invention as provided below.

SUMMARY OF THE INVENTION

In the present embodiments, a door operating mechanism is provided for rotatably switching a door relative to a box-shaped base between the closed position, with the opening of the base closed, and an open position, with the opening opened. In the present embodiments, the door has a support arm projected from it, a sector gear disposed in the arm, and a rotary gear disposed substantially in the center of the arc of the gear. The base has a first gear having internal teeth so disposed as to engage with the sector gear and a second gear resiliently and displaceably disposed, so as to engage with the rotary gear. The door may be rotatably switched along the track corresponding to the first gear via the engagements between the first gear and the sector gear, and between the second gear and the rotary gear. When the door receives a load in the direction towards the bottom of the base, while in the closed position, the load applied to the rotary gear as a consequence is absorbed through the resilient displacement of the second gear.

It should be noted that as used herein, the term "resiliently displaceable" means that the second gear is disposed so that its disposed location or position can be resiliently altered.

In the door operating mechanism described above, the door is supported via the engagement of the sector gear with the first gear of the base and the engagement of the rotary gear with the second gear. During the switching of the door from the closed position to the open position, and vice versa, the fulcrum of the door is rotated in compliance with the internal teeth of the first gear (and the gear portion of the second gear).

Accordingly, the mechanism has the same advantages as those of the mechanism shown in FIGS. 8(a) and 8(b), meaning an improved appearance achieved by minimizing the projected amount of the door when housed in the base in the open position, and an improved operation during the switching process achieved by controlling the rapid rotation with the engagements of the gears. In addition, in the mechanism according to the disclosed embodiments, when the door is subjected to an external load applied in the direction towards the bottom of the base while in the closed position, the load consequentially applied to the rotary gear is absorbed through the resilient displacement of the second gear, which is engaged with the rotary gear. Accordingly, the mechanism can securely prevent the engaged section between the rotary gear and the second gear, the section that supports the rotary gear, or the like, from incurring damage.

In a noted embodiment, it is preferable for the door operating mechanism described above to include a gear cover that is attached to the base, and to resiliently and displaceably support the second gear. Although it is permissible to attach the second gear to the base, installing it to the cover is simpler. In addition, covering of the first gear of the base, the sector gear and rotary gear of the door, i.e., the gear mechanism, with the gear cover, as shown in this embodiment, can maintain the preferred appearance and operational characteristics. Here, it is preferable for the second gear to be installed to a movable part that is slidably mounted to the gear cover and biased in one direction In a noted embodiment, disposing the second gear to the gear cover via the movable part can ensure the application of a resilient support force for the second gear at an appropriate level, to simplify the sliding support structure.

In a noted embodiment, the device includes the aforementioned door operating mechanism in the context of a unit for rotatably switching a door between the closed position, with the opening of a box-shaped base closed, and the open position, with the opening opened. Here, the device includes a biasing means to bias the door towards the open position. A lock means to locks the door in the closed position against the bias force of the biasing means and a rotary damper means are also included. The door may be switched between the closed and open positions by means of the door operating mechanism, as described above, where the damper means has its body attached to the arm, and the rotary gear of the door operating mechanism is installed to the output shaft of the body.

In addition to the aforementioned advantages of the door operating mechanism, this door operating unit can achieve smooth operation of the door by utilizing the damper means when the door is switched from the closed position to the open position with the bias force of the biasing means, or from the open position to the closed position, against the bias force. Moreover, since the rotary gear of the door operating mechanism is installed to the output shaft of the damper means, the assembly is simplified.

In a noted embodiment, it is preferable for the door operating unit described above to include a guide means that includes a shaft, which is projected from the bottom of the body of the damper means on the opposite side of the output shaft, and a sector guide wall, which is projected from the base while forming substantially the same track as that of the first gear, to allow the shaft to slide along the guide wall during the process of switching the door. This allows the door operating unit to utilize the guide means to even more stably maintain the switching operation of the door.

Each of the embodiments of the present invention is proposed herein in order to achieve the respective objectives discussed above.

The door operating mechanism according to the first embodiment disposes a second gear which is resiliently displaceable, thereby eliminating all the problems mentioned above and improving the quality and reliability as compared to the mechanism disclosed in JP 2003-129742. The mechanism can expand the range of applications, as it is applicable to a design in which the door is also used as an arm rest or a simple table, i.e., wherein the door is subjected to a large load.

In a noted embodiment, the mechanism according to the present invention includes the resiliently displaceable second gear in a simplified structure via a gear cover.

In another noted embodiment, the mechanism according to the present invention further simplifies the construction by employing a movable part as a support structure for the second gear.

In yet another embodiment, the door operating unit includes biasing means, lock means and damper means, and the present invention not only has the advantages of the aforementioned door operating mechanism, but also improves efficiency in assembly and reduces costs by allowing the rotary gear of the mechanism to be replaced with a damper means.

In yet another embodiment, the present invention includes a guide means to further improve the stability in the switching operation.

BRIEF DESCRIPTION OF THE DRAWINGS

FIG. 5(*a*) is a schematic diagram illustrating the state, wherein the second gear is incorporated in the gear cover shown in FIG. 1;

FIG. 5(*b*) is a sectional view of the schematic diagram of FIG. 5(*a*) at line 5(*b*)-5(*b*);

FIG. 5(*c*) is a first sectional view of the schematic diagram of FIG. 5(*a*) at line 5(*c*)(*d*)-5(*c*)(*d*);

FIG. 5(*d*) is a second sectional view of the schematic diagram of FIG. 5(*a*) at line 5(*c*)(*d*)-5(*c*)(*d*);

FIGS. 6(*a*) and 6(*b*) are schematic views showing the operation of the inventive box when the door is in the closed position;

FIGS. 7(*a*) and 7(*b*) are schematic views showing the operation of the inventive box when the door is in the open position; and FIGS. 8(*a*) and 8(*b*) are explanatory diagrams showing a conventional door operating mechanism and a unit including the inventive box.

DETAILED DESCRIPTION OF PREFERRED EMBODIMENTS

Preferred embodiments of the door operating mechanism of present invention are explained while referring to the figures. The reference numerals and drawings are not meant to limit the technical scope of the present invention.

In FIGS. 1-7(*b*), the members that are the same as or similar to those in the conventional mechanism shown in FIGS. 8(*a*) and 8(*b*) are denoted with the same reference numerals. In the explanation provided below, the overall mechanism is initially summarized in an overview, with the primary operation disclosed in reference to the disclosed embodiments.

Beginning with the overview, the door operating unit is exemplarily shown as a box 1 that comprises a box-shaped base 2 and a door 3 that opens and closes the upper opening of the box-shaped base 2. The unit includes a biasing means 5 to bias the door 3 from the closed position towards the open position, a lock means 4 to lock or unlock the door 3 in the closed position, covering the upper opening, against the bias force of the biasing means 5, a damper means 6, and a rotation guide means 8*b*, 29*a*.

The door 3 is rotatably switched between the open and closed positions by means of the door operating mechanism of the present invention. The door operating mechanism has the following characteristics. The door 3 has a support arm 31 projecting therefrom, a sector gear 37 disposed in the arm 31, and a rotary gear 7 disposed in the center of the arc of the sector gear 37. The rotary gear 7 provided also comprises the damper means 6.

The base 2 forms a window 24 from which the arm 31 inserted from the upper opening projects on the corresponding side. The base 2 has a first gear having internal teeth 27a disposed so as to engage with the sector gear 37 and a second gear 9b resiliently displaceably disposed so as to engage with the rotary gear 7. The second gear 28 interacts with a movable part 9 and is resiliently displaced via the movable part 9 relative to the gear cover 10, which is subsequently attached to the base 2. The major members, such as the base 2, door 3, movable part 9, and gear cover 10, are made of resin moldings.

Continuing with the noted embodiments, the box-shaped base 2 has an opening at the top. The interior 21 is defined by a lock means installation section 22 formed in the mid front section, and an upper flange 26, and related elements. Each side wall 23 is so formed that the front portion 23b is disposed one step inward from the back portion 23a, and a window 24 is formed in the end surface of the stepped section.

The front wall 25 has a void 25a that corresponds to the installation section 22. The upper flange 26 borders the upper opening with extended front and side sections so as to house the door 3 in the closed position. The interior 21 is sized to house the door 3 upright in the back. The installation section 22 includes a mounting hole through which the lock means 4 is installed. The lock means 4 is of a push-push locking mechanism similar to that disclosed in JP 2003-129742, i.e., the door 3 is locked when rotated while pushing towards the closed position, and unlocked when pushed further in the same direction and released. The lock means 4, however, may be of another mechanism. In this example, the base 2 is installed by inserting the portion below the flange 26 into the recess of an instrument panel or center console of a vehicle cabin.

The side walls 23 are shaped in the same way, each having the front portion 23b located inward from the back portion 23a. The window 24 is formed in the front end surface of the back portion 23a to allow communication between the interior of the base 2 and the outside.

Figure 1:
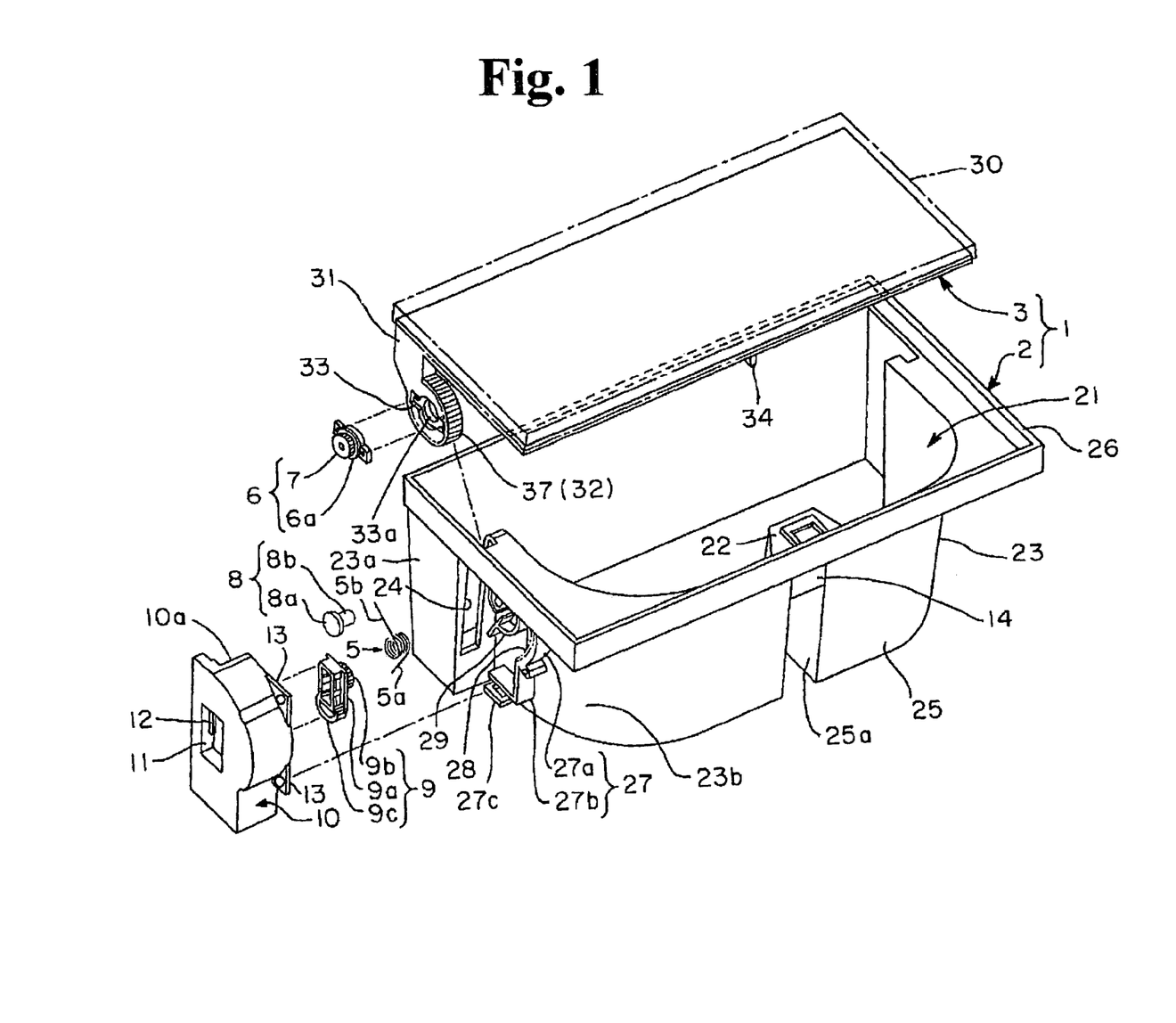
FIG. 1 is an exploded schematic diagram of a box to which the present invention is applied.
Figure 2:
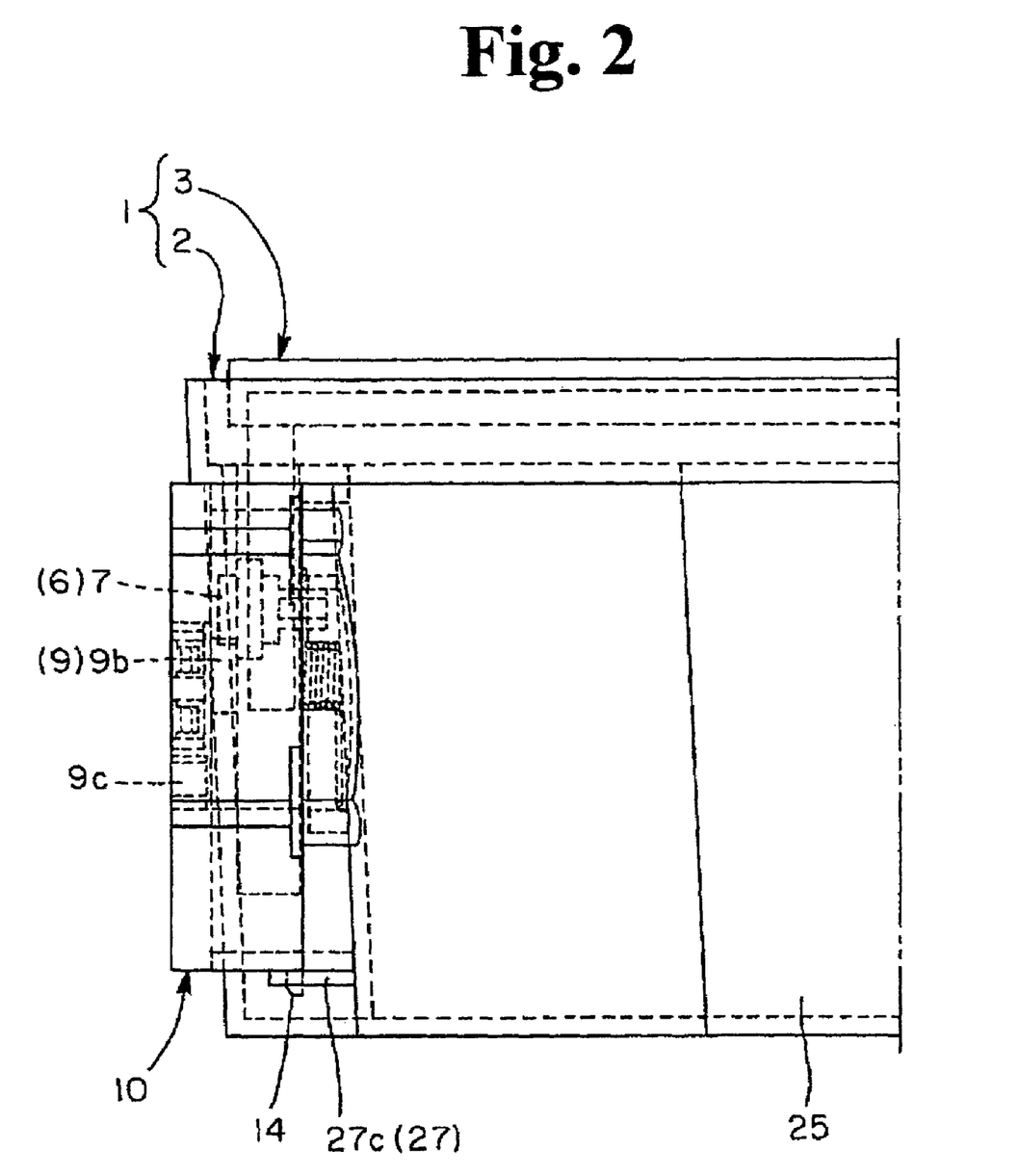
FIG. 2 is a partial schematic front view of the box shown in FIG. 1, wherein the door is in the closed position.
Figure 6A:
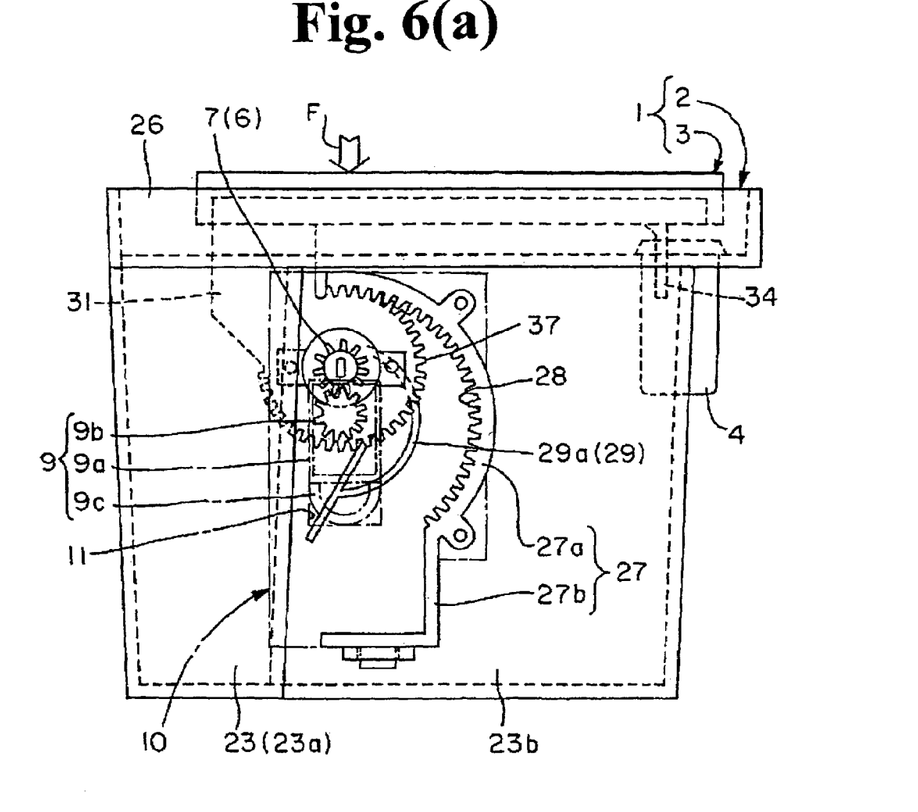
Figure 6B:
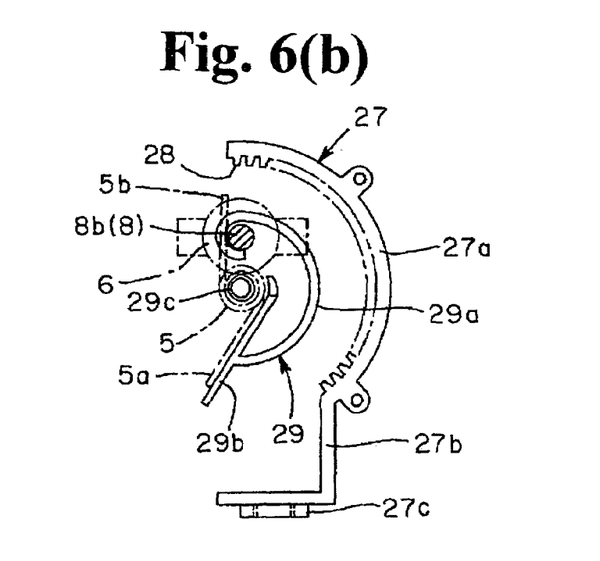

As shown in FIGS. 1, 6(a) and 6(b), the front portion 23b is provided with a rib 27, serving as a sector gear section and a mounting section, and a guide rib 29, both projecting in front of the window 24. The rib 27 is composed of an arc 27a, which forms the first gear, a substantially L-shaped section 27b connected below the arc 27a, and a section 27c projecting from the horizontal piece of the L-shaped section and having an engaging slot. The first gear 27a is an internal gear with continuously formed teeth, and is disposed up and down with the convex side facing the front. The rib 29 is positioned within the arc of the rib 27, and composed of a guide wall 29a, which is an arc substantially coaxial with the arc 27a, a stopper wall 29b, which extends diagonally with the mid section connected to the lower end of the guide wall 29a, and a substantially tubular support wall 29c, which is located near the upper end of the stopper wall 29b at a predetermined distance therefrom. The guide wall 29a is where the shaft 8b of the later described boss 8 is slidably guided along the sector inner surface.

Figure 7A:
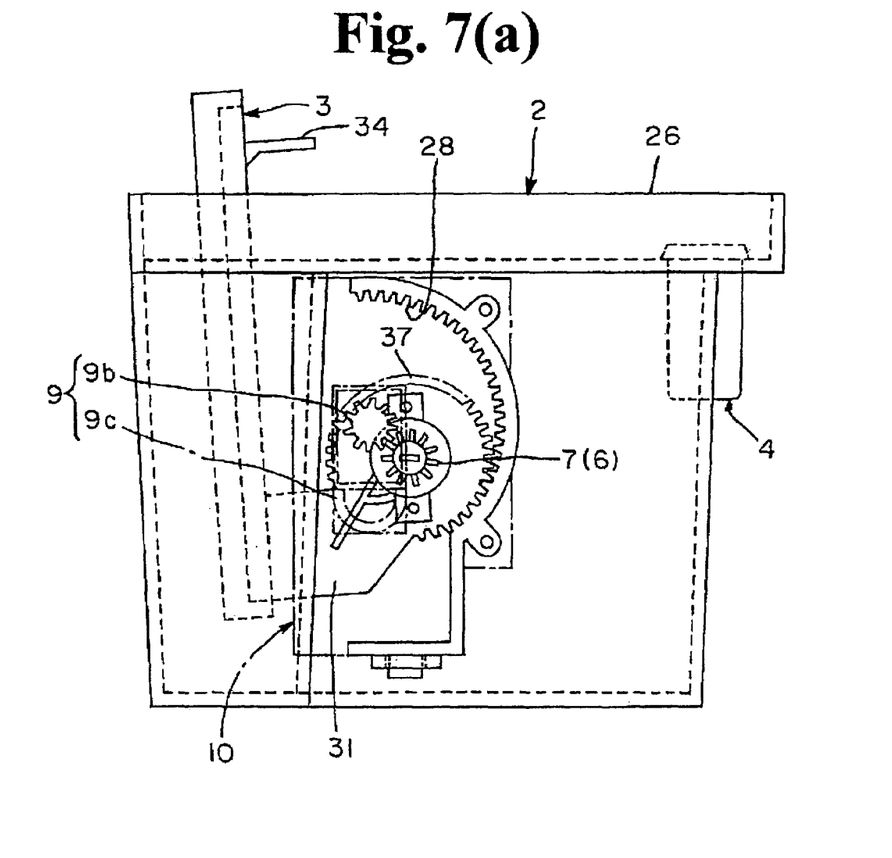
Figure 7B:
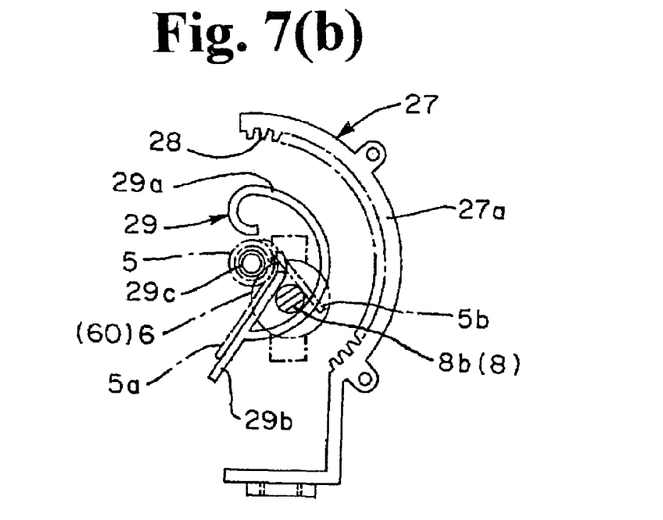

The upper end side is formed so as to receive the shaft 8b on the inside (see FIG. 6(b)), and the lower end side is connected to the stopper wall 29b with gradually narrowed spacing therebetween to thereby restrict the downward movement of the shaft 8b in conjunction with the stopper wall 29b (see FIG. 7(b)). The support wall 29c is where the biasing means 5 is supported. That is, the biasing means 5 is a wire spring, wrapped around and held by the support wall 29c. One end 5a of the wire spring is secured by the stopper wall 29b, and the other end 5b is hooked at the shaft 8b with accumulated bias force. All that is required of the biasing means 5 is to urge the door 3 towards the opening position, and thus the configuration shown FIG. 8 may as well do.

The gear cover 10 with which the movable part 9 is assembled is attached to the aforementioned rib 27. As shown in FIGS. 1, 4 and 5(a)-5(d), the gear cover 10 visually covers the first gear 28, rib 29, and biasing means 5. It is shaped so as to allow the arm 31 of the door 3 to be inserted from the section 10a where the rear section is missing, and has an opening 11 disposed substantially in the center in correspondence with the movable part 9, mounting sections 13 projecting at the front edge in correspondence with the rib 27, and a tongue 14 projecting from the lower front edge.

Two opposing stoppers 12 are formed in two inner surfaces of the opening 11. The movable part 9 integrally forms a body 9a, a second gear 9b projecting from the body 9a at the upper front portion, and a resilient section 9c formed at the bottom of the body 9a. The body 9a is roughly shaped as a rectangular frame, and has tabs 9d located at the front edge slightly distant from the overhangs formed on both sides (see FIG. 5(b)).

The second gear 9b is a spur gear with teeth continuously formed on the outer periphery of the cylindrical column, and engages with the rotary gear 7 when positioned substantially in the middle of the arc of the first gear 27a. The resilient section 9c is arcuate or U-shaped, and is resiliently deformed so as to reduce the hollow section when the body 9a receives a downward load.

Figure 3:
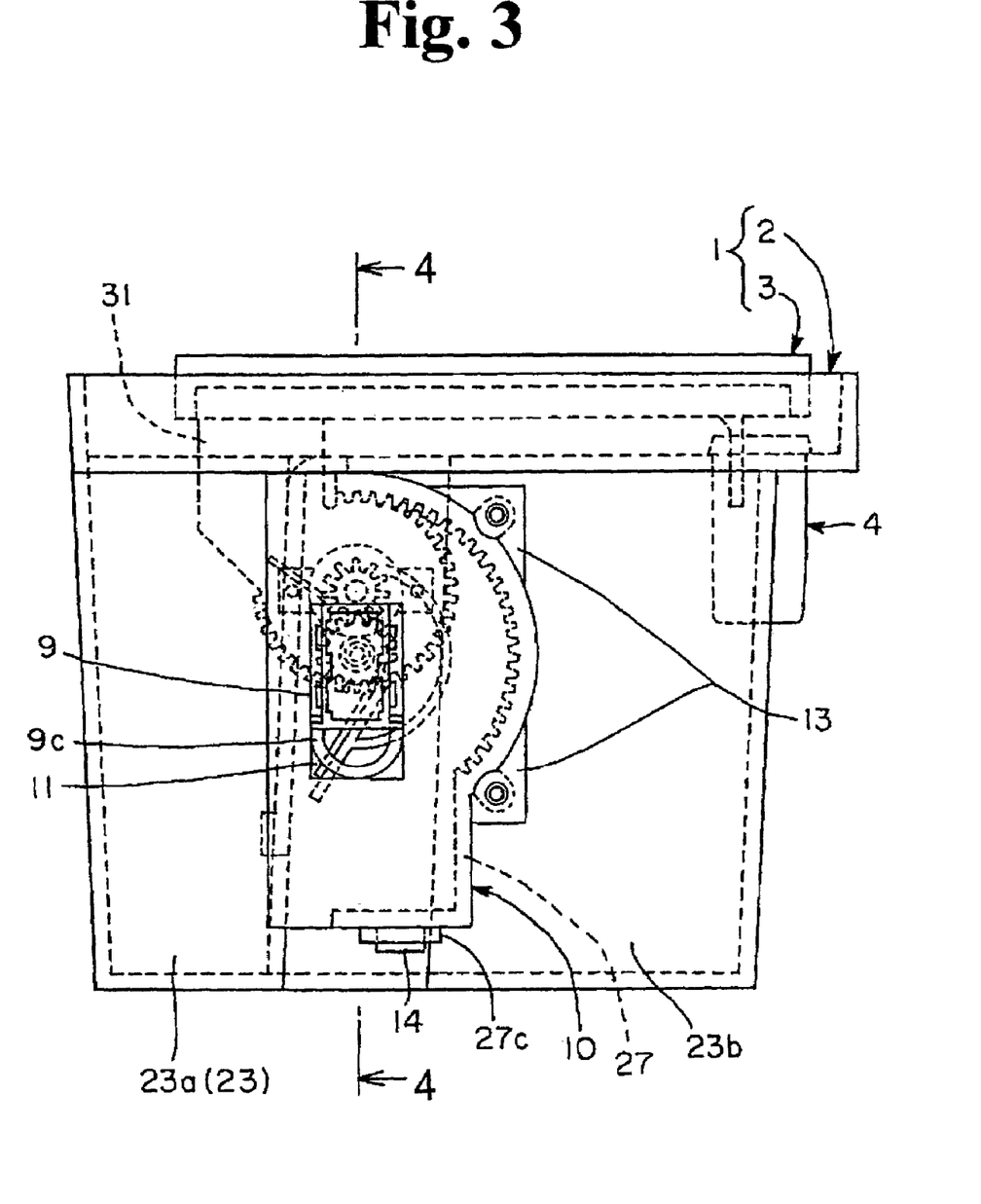
FIG. 3 is a schematic side view of the box shown in FIG. 1, wherein the door is in the closed position.
Figure 4:
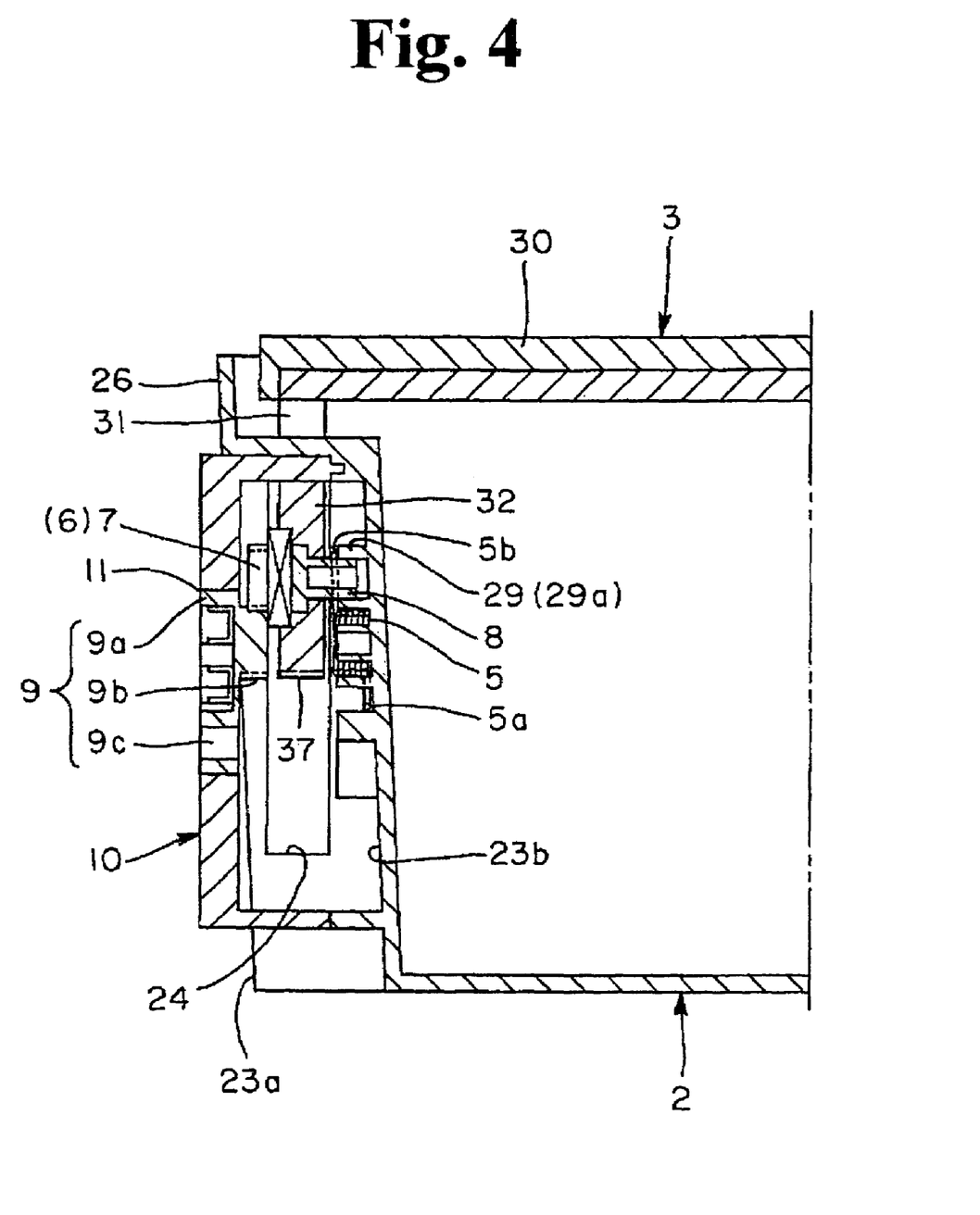
FIG. 4 is a schematic sectional view of the box shown in FIG. 3 along line 4-4 indicated in FIG. 3.

The movable part 9 described above, as shown in FIGS. 5(a)-5(d), is assembled with the gear cover 10 by being inserted into the opening 11 from the inside of the cover. That is, when the movable part 9 is pressed inside the opening 11, each of the tabs 9d resiliently goes over the stopper 12 to interpose the stopper 12 with the respective overhang, and is supported within the opening 11 so as to slide up and down while maintaining the interposing condition. In this supported state, the second gear 9b is projecting inward. The gear cover 10, as shown in FIG. 3, is positioned and installed with screws or the like (not shown) while laying the mounting sections 13 on the corresponding sections of the rib 27, and engaging the tongue 14 with the engaging slot of the section 27c of the rib 27.

The door 3 is a flat plate, the main upper surface of which is covered by the cover material 30, and has support arms 31 projecting from both sides in the rear, and discs 32 disposed at the tip ends of the arms 31. The arms 31 can be projected from the corresponding windows 24 of the base 2, with margins, to the outside, i.e., to the outer side of the front portions 23b of the side walls 23. The disc 32 is provided with a stepped mounting section 33 for the damper means, a mating slot 33a passing through the center of the mounting section 33, and a gear 37 having an arcuate outer periphery. The mating slot 33a is composed of a large diameter hole on the side of the mounting section 33 and a small diameter hole on the inside in correspondence with the later described boss 8 (see FIG. 4).

The damper means 6 is mounted to the mounting section 33. The damper means 6 is made of a well-known rotary oil dampener or the like, and has an output shaft subjected to the resistance of the oil, which fills the body 6a, and a rotary gear 7 mounted to the output shaft. In this configuration, moreover, a boss 8 is connected to the bottom surface on the opposite-.side of the output shaft of the body 6a. This boss 8 has a larger diameter mounting section 8a and a tubular shaft 8b, which is smaller in diameter than the mounting section 8a, and is connected to the bottom surface via the mounting section 8a using an appropriate method. The damper means 6 is arranged within the stepped section of the mounting section 33 with the body 6a projecting the shaft 8b outward from the mating slot 33a, and mounted with a screw or the like (not shown). In the mounted state, the shaft 8b projects to the inside of the arm 31 to slightly abut against the inner surface of the arc of the guide wall 29a of the aforementioned rib 29. The rotary gear 7 can engage with the teeth of the second gear 9b of the movable part 9 when projected outside of the arm 31.

The door 3, described above, may for example be assembled with the base 2 in the following manner. First, the end 5a of the biasing means 5 is disposed along the stopper wall 29b while allowing the wound section to be held by the support wall 29c. From this state, the arm 31 is projected from a corresponding window 24 to allow the gear 37 to engage with the first gear 27a, and the other end 5b of the biasing means 5 is hooked at the shaft 8b while gaining spring pressure. Next, the gear cover 10 having the movable part 9 incorporated therein is mounted to the base 2 in the steps described above. At this time, the second gear 9b of the movable part 9 engages the rotary gear 7. Then, the door 3 is rotatably supported by the base 2 via the engagements between the gear 37 and the first gear 27a, and between the rotary gear 7 and the second gear 9b.

In the door operating mechanism according to the present invention, the damper means 6 described above may be omitted.

In this case, a rotary gear similar to the rotary gear 7 is rotatably mounted to the disc 32, for example, and the boss 8 is disposed in the corresponding section of the disc 32.

Next, the operation of the door 3 will be described with reference to FIGS. 6(a), 6(b), 7(a) and 7(b). FIG. 6(a) is a side elevation schematically showing the state wherein the door is in the closed position. FIG. 6(b) is a diagram schematically showing the positions of the boss 8 and the biasing means 5 in the closed position. FIG. 7(a) is a side elevation schematically showing the state wherein the door is in the open position. FIG. 7(b) is a diagram schematically showing the positions of the boss 8 and the biasing means 5 in the open position. In each of these figures, since the gear mechanism is invisible because of the gear cover 10, the gear cover 10, movable part 9 and biasing means 5 are shown with imaginary lines.

FIGS. 6(a) and 6(b) show the state wherein the opening of the base 2 is completely closed by the door 3. In this closed position, the door 3 is locked by the lock means 4 against the bias force of the biasing means 5. The gear 37 is engaged with the upper teeth of the internal teeth of the first gear 28, and the rotary gear 7 is engaged with the upper teeth in the outer periphery of the second gear 9b.

To switch the door 3 to the open position, the front side of the door 3 is pressed down and released. This is another push operation to further push the door 3 in the same direction from the closed position, i.e., a push operation in the closing direction. Then, the door 3 is rotated towards the open position using the bias force of the biasing means 5 after unlocking the aforementioned engaging piece 34 from the lock means 4.

During the process to reach the open position shown in FIGS. 7(a), 7(b), the gear 37 moves downward, while engaging with the internal teeth of the first gear 28, from the teeth in the upper section to the teeth in the lower section. At the same time, the rotary gear 7 moves downward, while engaging with the outer peripheral teeth of second gear 9b and rotating around the second gear 9b in association with the movement of the gear 37, from the teeth in the upper section to the teeth in the lower section. In other words, in this configuration, the door 3 is rotatably switched to the open position with an accompanying downward movement resulting from the rotation of the gear 37 along the track of the inner teeth of the first gear 27a, and the movement of the rotary gear 7 around the second gear 9b, similar to a planetary motion.

During the switching process, the speed at which the door 3 moves is decelerated by the aforementioned engagements of the gears and the damping force of the damper means 6. The door 3, therefore, is always moved at a constant speed from the closed position to the open position. In the open position shown in FIGS. 7(a), 7(b), owing to the aforementioned downward movement of the door 3, the portion of the door that extends from within the base 2 is reduced, and thus the appearance is improved.

To switch the door 3 back to the closed position, the extended portion of the door 3 is pulled against the bias force of the biasing means 5. This time, the gear 37 moves upward, while engaging the internal teeth of the first gear 27a, from the teeth in the lower section to the teeth in the upper section. At the same time the rotary gear 7 moves upward, while engaging with the outer peripheral teeth of and rotating around the second gear 9b, i.e., while moving along the gear 37, from the teeth in the lower section to the teeth in the upper section. In the closed position, the engaging piece 34 is hooked to the lock means 5 with a push operation.

The basic operation described above is similar to that of the mechanism disclosed in JP 2003-129742. This configuration, however, is superior to the mechanism disclosed in JP 2003-129742 in the following respects.

Figure 5A:
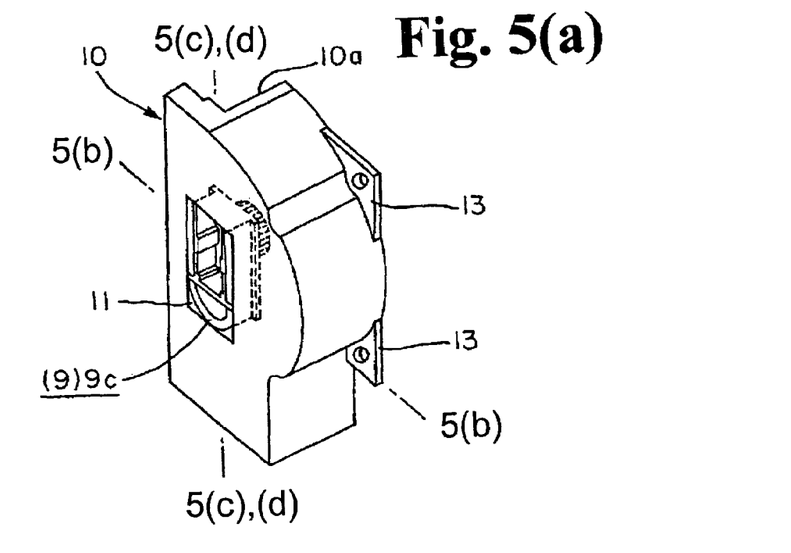
Figure 5B:
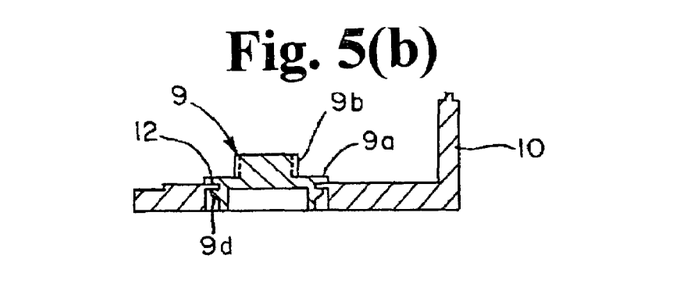
Figure 5C:
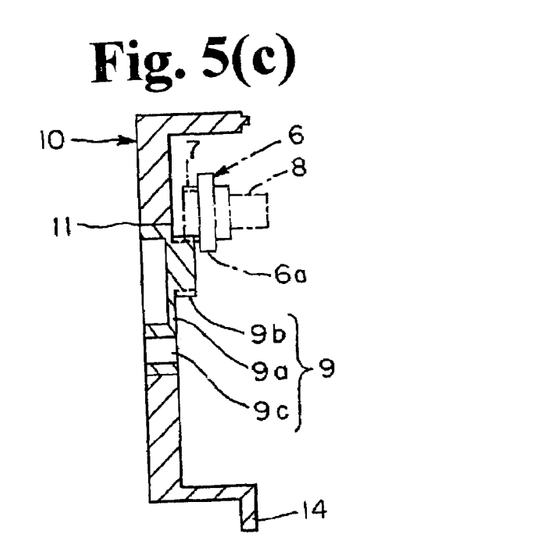
Figure 5D:
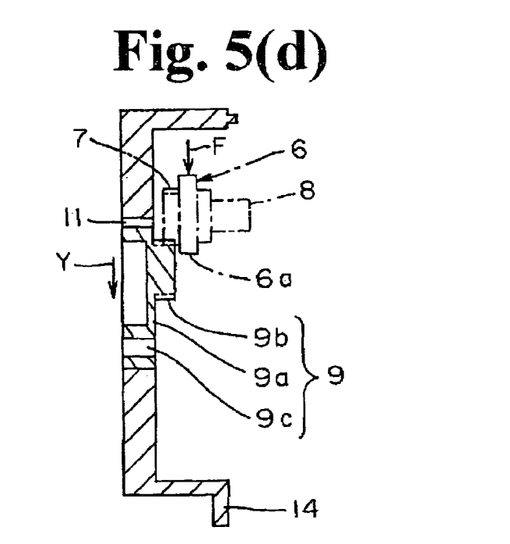

First, when the door 3 is subjected to a large downward load F in the closed position shown in FIGS. 6(a) and 6(b), the load is applied to the gear mechanism, particularly to the rotary gear 7 and the second gear 9b. As shown in FIGS. 5(c) and 5(d), when the second gear 9b receives a downward load Y from the rotary gear 7, the movable part 9 changes its position downward relative to the accompanying resilient displacement of the resilient section 9c. As a result, the second gear 9b mitigates and absorbs the load through the resilient displacement of the resilient section 9c, and thus the rotary gear 7 does not receive excessive load on the engaged section or the output shaft. This configuration, therefore, securely prevents the possibility of damaging the output shaft of the damper means 6 and the engagements of gears, and of oil leaking from the body 6a.

Secondly, in the inventive construction, the door 3 is rotated through the engagements of gears described above. Since the shaft 8b connected to the body 6a is slid along the guide wall 29a during the rotation, respective gear engagements are stably maintained even when the box 1 is subjected to vertical vibration.

Third, in the inventive construction, the upper end section of the guide wall 29a is curved so as to receive the shaft 8b on the inside. Accordingly, when the door 3 receives the aforementioned downward load F in the closed position, the shock is absorbed by the upper end section of the guide wall 29a, and also by the shaft 8b, which is tubular in shape (see FIG. 6(b)). Moreover, the lower end section of the guide wall 29a is disposed so as to gradually reduce the spacing from the stopper wall 29b. Accordingly, when the door 3 reaches the open position, the downward movement of the shaft 8b is restricted between the lower end of the guide wall 29a and the stopper wall 29b to thereby prevent the door 3 from rattling in the open position (see FIG. 7(b)).

Fourth, the foregoing operations function in the same manner even when the base 2 is arranged laterally, i.e., the opening is set in the front-to-back direction instead of the vertical arrangement shown in the present embodiment. In addition, the mechanism of the present invention and the unit including the same is applicable even for embodiments wherein the door 3 also is used as an arm rest or a simple table.

The disclosure of Japanese Patent Application No. 2003-374246 filed on Nov. 4, 2003 is incorporated herein.

While the invention has been explained with reference to the specific embodiments, the explanation is illustrative and the invention is limited only by the appended claims.

What is claimed is:

1. A door operating mechanism, comprising:
   a door having a support arm projecting from the door, said support arm having a sector gear, and a rotary gear disposed substantially in a center of the sector gear,
   a base for rotatably supporting the door to open between a closed position and an open position, said base including a first gear having internal teeth disposed to engage said sector gear,
   a gear cover attached to the base and having an opening therein, and
   a movable part including a body via a shaft situated in the opening to be slidable relative to the gear cover, a second gear fixed to the body, and a resilient section attached to the body to resiliently and displaceably hold the body relative to the gear cover, said second gear engaging said rotary gear so that when a load is applied to the door in the closed position towards a bottom of the base, the load applied to the rotary gear and second gear is absorbed by resilient displacement of said body holding the second gear.

2. A door operating mechanism according to claim 1, wherein said door is rotatably disposed along a track corresponding to said first gear via engagements between said first gear and said sector gear, and engagements between said second gear and said rotary gear.

3. A door operating mechanism according to claim 1, wherein said body is urged in one direction by the resilient section.

4. A door operating mechanism according to claim 2, further comprising biasing means to bias said door towards the open position; lock means to lock said door in the closed position against the bias force of said biasing means; and rotary damper means having a damper body attached to said support arm and an output shaft attached to said rotary gear.

5. A door operating unit according to claim 4, further comprising guide means comprising a shaft projecting from a bottom of the damper body on an opposite side of said output shaft, and a sector guide wall projecting from said base and substantially forming said track to allow said output shaft to slide along said guide wall while the door is rotatably disposed.

6. A door operating mechanism according to claim 1, wherein said body has a rectangular frame and tabs formed at front side edges of the frame to hold an edge of the opening of the gear cover therebetween.

7. A door operating mechanism according to claim 6, wherein the resilient section is attached to a lower end of the body to urge the body upwardly.

* * * * *